United States Patent Office 2,883,438
Patented Apr. 21, 1959

2,883,438
PROCESS FOR THE PREPARATION OF PARA-DIISOPROPYLBENZENE

Robert B. Egbert, Roslyn Heights, N.Y., assignor, by mesne assignments, to Mid-Century Corporation, Chicago, Ill., a corporation of Delaware No Drawing. Application May 5, 1954
Serial No. 427,864

19 Claims. (Cl. 260—671)

This invention relates to a process for the preparation of high purity para-diisopropylbenzene from benzene and propylene, and more particularly to such a process wherein benzene is converted to cumene by reacting with propylene or with a poly-isopropylbenzene in the presence of an acid reacting alkylation catalyst, such as aluminum chloride or other Friedel-Crafts type catalyst, and the resulting reaction product or the cumene which may be separated therefrom by distillation, is reacted with propylene in the presence of a catalyst of the above type under non-equilibrium conditions, to produce a reaction mixture containing the isomeric diisopropylbenzenes together with mono-isopropylbenzene and also higher isopropylbenzenes, separating the isomeric diisopropylbenzene fraction therefrom, and then separating the para-diisopropylbenzene from the latter fraction. The residue diisopropylbenzenes as well as the mono- and higher poly-diisopropylbenzenes are recycled to the reaction.

The para-diisopropylbenzene product is useful as a solvent, or as an intermediate raw material for the preparation of para-dihydroxybenzene (hydroquinone) by the so-called hydroperoxide process. One of its most important uses, however, is as an intermediate for the preparation of terephthalic acid.

The art is confronted with the problem of providing high purity diisopropylbenzene in an economic manner.

The reaction of benzene or alkyl benzenes with propylene in the presence of an alkylation catalyst such as aluminum chloride is known to give mixtures of the various possible substitution derivatives as well as of the various possible isomers, and a particular problem in connection with preparing poly-isopropylbenzenes involves both the production of the diisopropyl compound and also the production and recovery in economic yields of the para-isomer.

The discoveries associated with the invention and the solution of the above problem, and the objects achieved in accordance with the invention as set forth herein include the following: the preparation of cumene by the reaction of benzene with propylene or poly-isopropylbenzenes in the presence of an acid reacting alkylation catalyst such as aluminum chloride or other Friedel-Crafts type catalyst under equilibrium conditions to obtain a maximum output of cumene, the separation therefrom of a fraction containing a major proportion of cumene, or, if desired, the separation therefrom of substantially pure cumene, the reaction of this cumene with propylene under non-equilibrium conditions to produce a reaction mixture containing diisopropylbenzene, separating therefrom the diisopropylbenzene fraction, and then separating the para-diisopropylbenzene from this fraction. The residue from this fraction and the remainder of the reaction mixture being recycled in the process; and other objects which will be apparent as details or embodiments of the invention are set forth hereinafter.

In this way, a diisopropylbenzene fraction is obtained having a substantially higher concentration of the para-isomer, e.g. an increase of about 50% or more of this isomer.

In order to facilitate a clear understanding of the invention, the following preferred specific embodiments are described in detail.

Into a suitable reactor having a corrosion resistant inner surface (e.g. glass, ceramic or corrosion resistant metal or alloy), equipped with agitating means such as a gas or mechanical device, and with a means for heating or cooling the contents thereof such as a coil or jacket, a reflux condenser, a gas inlet tube, and optionally a vent for passing off low boiling materials, there are charged:

65.4 parts by weight of aluminum chloride
1700 parts benzene (C.P. or thiophene free)
32.7 parts isopropyl chloride (or anhydrous hydrogen chloride); then
915 parts of propylene (e.g. 99% propylene gas)

is absorbed therein over a period of 2 hours, with agitation, while the temperature is maintained in the range of about 70 to 100° C.; the feed rate being about 75 liters per hour at ordinary temperature and pressure. This temperature may be maintained either by passing cooling water through the indirect heat exchange means or by permitting the mixture to boil and refluxing condensate therefrom if the temperature tends to go too high, or passing steam through these means if the temperature tends to go too low.

Alternatively, propylene and part of benzene may be replaced with an equivalent amount of poly-isopropylbenzene.

The reaction mixture is cooled to room temperature, and the lower catalyst sludge phase is separated from the upper hydrocarbon phase and may be recycled to the reactor, if desired. The cumene, or the upper hydrocarbon phase, is charged to a reactor similar to the above in the proportions of 1700 parts of cumene
5.75 parts of aluminum chloride
4.31 parts of isopropyl chloride or hydrogen chloride
595 parts of propylene is absorbed therein over a period of 2 hours, with agitation, at a temperature in the range of 70 to 100° C.

The reaction mixture is then processed as above and the hydrocarbon layer is washed with about an equal volume of about 10% aqueous sodium hydroxide and then with about an equal amount of water, and then dried, e.g. by azeotropically distilling off the water with the lower boiling hydrocarbon present. The dried hydrocarbon layer is then fractionated in an efficient column and the following analysis is obtained (weight basis):

| | Percent |
|---|---|
| Hexane | 0 |
| Benzene | 8.0 |
| Cumene | 11.7 |
| Diisopropylbenzene | 28.2 |
| Triisopropylbenzene | 50.3 |
| Tetraisopropylbenzene | 1.8 |

The diisopropylbenzenes fraction obtained in accordance with the above non-equilibrium example contains about 63% para-diisopropylbenzene and about 29.5% of the meta and about 4.4% of the ortho isomer.

In a comparable run carried out with 3 times as much aluminum chloride, to give equilibrium conditions, the hydrocarbon layer contains 57.7% diisopropylbenzenes, but this fraction contains only about 40% of the para, together with about 63% of the meta and 4% of the ortho isomers.

By operating in this 2-stage system and carrying out the conversion of the cumene to diisopropylbenzene under non-equilibrium conditions, there is a very substantial reduction in overall capital cost as well as manufacturing costs for a given output of para-diisopropylbenzene.

The para-diisopropylbenzene fraction is readily separated from the other isomers by efficient fractional distillation since it boils at 210.4° C. at 760 mm. Hg, whereas the ortho isomer boils at about 203.8° C. and the meta isomer 203.2° C.

The process of the invention may be conducted continuously, and this method is especially desirable for commercial operation. The required amounts of aluminum chloride and isopropyl chloride are charged into the first reactor and the benzene is charged therein simultaneously with the higher poly-isopropylbenzene or propylene, in a continuous manner and the part of the reaction mixture is continuously removed, settled, the lower catalyst layer being removed and recycled and the upper hydrocarbon layer being further processed. This hydrocarbon may be passed directly to a second reactor or it may be fractionated and only the cumene fraction passed to the second reactor, as are also the aluminum chloride, the isopropyl chloride and the propylene. The part of the reaction mixture is continuously removed and processed as above, except that the hydrocarbon layer is scrubbed in a countercurrent manner with the dilute aqueous caustic and then with the water, and then subjected to the distillation procedures to recover the desired para-diisopropylbenzene, with recycling and with the other residue materials therein.

Readily available propylene stocks may be used, preferably free of other unsaturates. The reactor system may be provided with vents to pass off lower boiling hydrocarbons which do not react therein. A hexane fraction or a cumene fraction, or both, may be removed as overhead, instead of recycling them to the reactor.

The benzene reactant should be free from other aromatics (except cumene) and may contain some paraffins, which may be separated out in the system; desirably it is of low sulfur content, and preferably sulfur free.

Comparable or desirable results are obtained with various modifications of the foregoing such as the following. The catalyst may be any acid reacting alkylation catalyst, preferably of the Friedel-Crafts type such as aluminum chloride, hydrogen fluoride, or boron trifluoride. When all of the advantages of such catalysts are not required, other materials such as sulfuric acid or phosphoric acid may be used.

In the first of cumene preparation step, the ratio of propylene to benzene should be in the range of about 0.7 to about 1.5 moles per mol of benzene, including equivalent propylene and benzene in recycle polydiisopropylbenzenes, desirably 0.9 to 1.12 and preferably about 1.1.

In the second or non-equilibrium reaction step, the ratio of propylene to cumene should be in the range of about 0.8 to about 1.5, desirably 0.9 to about 1.3 and preferably about 1.1 moles of propylene per mol of cumene. In this second reaction step, the reaction is stopped before equilibrium is reached. To facilitate this, a relatively low concentration of catalyst or lower reaction rate conditions are used. In the first step the concentration of catalyst is such as to give an equilibrium mixture substantially when the addition of propylene or propyl benzene is completed and generally this is in the range of about 2 to 5% of catalyst per weight of product produced. In the second or non-equilibrium step, the amount of catalyst is only about $\frac{1}{10}$ to $\frac{3}{10}$ of that used in the first or above-mentioned step.

The reaction temperature may be in the range of $-80$ to 150° C., preferably 50 to 110° C. for the aluminum chloride catalyst. The reaction time may be in the range of 0.1 to 10 hours, preferably 0.5 to 4 hours. Higher temperatures are generally associated with shorter times, and the catalyst, temperature and time conditions are selected to give the desired conversion at the desired throughput rates. Additional aluminum chloride catalyst may be added as required (e.g. as determined by a spot check alkylation reaction using as catalyst a sample of the sludge being recycled for catalytic activity). The spent catalyst is treated with water containing 15–30% hydrochloric acid, to break the catalyst complex, and the resulting hydrocarbon phase is separated and re-used in the system.

It is indeed surprising that the process of the invention may be carried out in such a convenient manner, with high conversions to give a substantially theoretical yield of the desired product.

In view of the foregoing discussions, variations and modifications of the invention will be apparent to one skilled in the art, and it is intended to include within the invention all such variations and modifications except as do not come within the scope of the appended claims.

This application is a continuation-in-part of S.N. 305,972, filed August 23, 1952, now abandoned.

I claim:

1. In a process for the preparation of high purity para-diisopropylbenzene, the steps of preparing an equilibrium reaction mixture from benzene and a propyl group supplying reactant selected from the group consisting of propylene and poly-isopropylbenzenes in the presence of from about 2 to 5% by weight based on the product produced of an acid-reacting alkylation catalyst, separating therefrom a fraction containing a major proportion of cumene, reacting said cumene fraction with propylene in the presence of an acid-reacting alkylation catalyst under non-equilibrium conditions, separating the diisopropylbenzene fraction containing a relatively high proportion of para-diisopropylbenzene and separating high purity para-diisopropylbenzene therefrom, the amount of catalyst in the reaction under non-equilibrium conditions being in the range of from about $\frac{1}{10}$ to $\frac{3}{10}$ that required for equilibrium conditions.

2. A process of claim 1 wherein the catalyst is aluminum chloride.

3. A process of claim 1 wherein the catalyst is hydrogen fluoride.

4. A process of claim 1 wherein the catalyst is boron fluoride.

5. A process of claim 1 in which, in the reaction under equilibrium conditions, the ratio of propyl groups to benzene is in the range of about 0.7 to about 1.5 mols per mol of benzene.

6. A process of claim 1 in which, in the reaction under non-equilibrium conditions, the ratio of propylene to cumene is in the range of about 0.8 to 1.5 mols of propylene to mol cumene.

7. A process of claim 5 in which, in the reaction under equilibrium conditions, the ratio of propyl groups to benzene is in the range of about 0.9 to 1.12 mols per mol of benzene.

8. A process of claim 1 in which the reaction under non-equilibrium conditions, the ratio of propylene to cumene is in the range of about 0.9 to 1.3 mols of propylene per mol of cumene.

9. A process of claim 5 in which, in the reaction under equilibrium conditions, the molar ratio of propyl groups to benzene is 1.1.

10. A process of claim 6 in which, in the reaction under non-equilibrium conditions the molar ratio of propylene to cumene is 1.1.

11. In a process for the preparation of high purity para-diisopropylbenzene, the steps of preparing an equilibrium reaction mixture from benzene and a propyl group supplying reactant selected from the group consisting of propylene and poly-isopropylbenzenes, in which the molar ratio of propyl groups to benzene is in the range of from about 0.9 to 1.12, in the presence of from about 2 to 5% by weight of aluminum chloride catalyst based on the product produced, separating therefrom a fraction containing a major proportion of cumene, reacting said cumene fraction with propylene in the molar ratio of from about 0.9 to 1.3 mols propylene per mol cumene in the presence of from about 1/10 to 3/10, the amount of aluminum chloride catalyst utilized in the production of the equilibrium reaction mixture, separating the diisopropylbenzene fraction containing a relatively high proportion of para-diisopropylbenzene and separating high purity para-diisopropylbenzene therefrom.

12. In a cyclic process for the preparation of high purity para-diisopropylbenzene, the steps of preparing in a first reactor an equilibrium reaction mixture from benzene and a propyl group supplying reactant selected from the group consisting of propylene and poly-isopropylbenzenes in the presence of from about 2 to 5% by weight based on the product produced of an acid-reacting alkylation catalyst, separating therefrom a fraction containing a major portion of cumene, recycling the residue to said first reactor, reacting, in a second reactor, said cumene fraction with propylene in the presence of an acid-reacting alkylation catalyst under non-equilibrium conditions, the amount of catalyst being in the range of from about 1/10 to 3/10 that required under equilibrium conditions, separating the diisopropylbenzene, recycling the residue to said first reactor, separating high purity para-diisopropylbenzene from the diisopropylbenzene fraction and recycling the residue of said fraction to said first reactor.

13. A process of claim 12, wherein the catalyst is aluminum chloride.

14. A process of claim 12, in which the catalyst is hydrogen fluoride.

15. A process of claim 12, in which the catalyst is boron fluoride.

16. A process of claim 12, in which the ratio of propyl groups to benzene in the first reactor is in the range of about 0.9 to 1.12.

17. A process of claim 12 in which the ratio of propylene to cumene in the second reactor is in the range of about 0.9 to 1.3 mols of propylene per mol of cumene.

18. A process of claim 12 in which, in the first reactor, the molar ratio of propyl groups to benzene is 1.1.

19. A process of claim 12 in which, in the second reactor, the molar ratio of propylene to cumene is 1.1.

References Cited in the file of this patent

UNITED STATES PATENTS

| | | |
|---|---|---|
| 2,382,506 | Schulze | Aug. 14, 1945 |
| 2,405,874 | Bullard et al. | Aug. 13, 1946 |
| 2,589,057 | Corson et al. | Mar. 11, 1952 |
| 2,730,557 | Max et al. | Jan. 10, 1956 |
| 2,744,150 | Enos et al. | May 1, 1956 |

OTHER REFERENCES

Slanina et al.: Jour. Am. Chem. Soc., vol. 57 (Sept. 1935), pages 1547–49.

Melpolder et al.: Jour. Am. Chem. Soc., vol. 70 (Mar. 1948), pages 933–939.

Condon: Jour. Am. Chem. Soc., vol. 70, No. 6 (June 1948), pages 2265–67.